United States Patent [19]
Rickman et al.

[11] Patent Number: 6,032,538
[45] Date of Patent: Mar. 7, 2000

[54] PRESSURE SENSOR MOUNTING DEVICE FOR HIGH TEMPERATURE ENVIRONMENTS

[75] Inventors: Denis D. Rickman; Bruce C. Barker, both of Clinton; John H. Stout, Vicksburg, all of Miss.

[73] Assignee: U.S. Army Corps of Engineers as Represented by the Secretary of the Army, Washington, D.C.

[21] Appl. No.: 09/270,798

[22] Filed: Mar. 17, 1999

[51] Int. Cl.$^7$ .................................................. G01L 7/00
[52] U.S. Cl. ............................................................ 73/756
[58] Field of Search .............................. 73/706, 708, 756

[56] References Cited

U.S. PATENT DOCUMENTS

| | | | |
|---|---|---|---|
| 4,625,559 | 12/1986 | Carter et al. | 73/706 |
| 4,920,805 | 5/1990 | Yajima et al. | 73/706 |
| 5,046,365 | 9/1991 | Kumley et al. | 73/708 |
| 5,119,680 | 6/1992 | Myhre | 73/756 |
| 5,605,360 | 2/1997 | Kurisake et al. | 73/756 |

*Primary Examiner*—William Oen
*Attorney, Agent, or Firm*—Luther A. Marsh

[57] ABSTRACT

A mounting device for pressure transducers comprises a housing with two chambers separated by an acoustic filter/heat sink. A blast shield having at least one opening allows communication between the measured environment and the first chamber and provides protection to the acoustic filter/heat sink film blast particles and flame. The acoustic filter/heat sink comprises a plurality of tortuous paths through a material having a high thermal conductivity and high specific gravity. The pressure transducer is located in the second chamber and is mounted on a thermally insulating mounting plate. The tortuous paths provide attenuation of high frequency, high amplitude pressure transients, cools the medium entering the filter due to the pressure transient and protects the transducer from corrosive particles and aerosols.

20 Claims, 5 Drawing Sheets

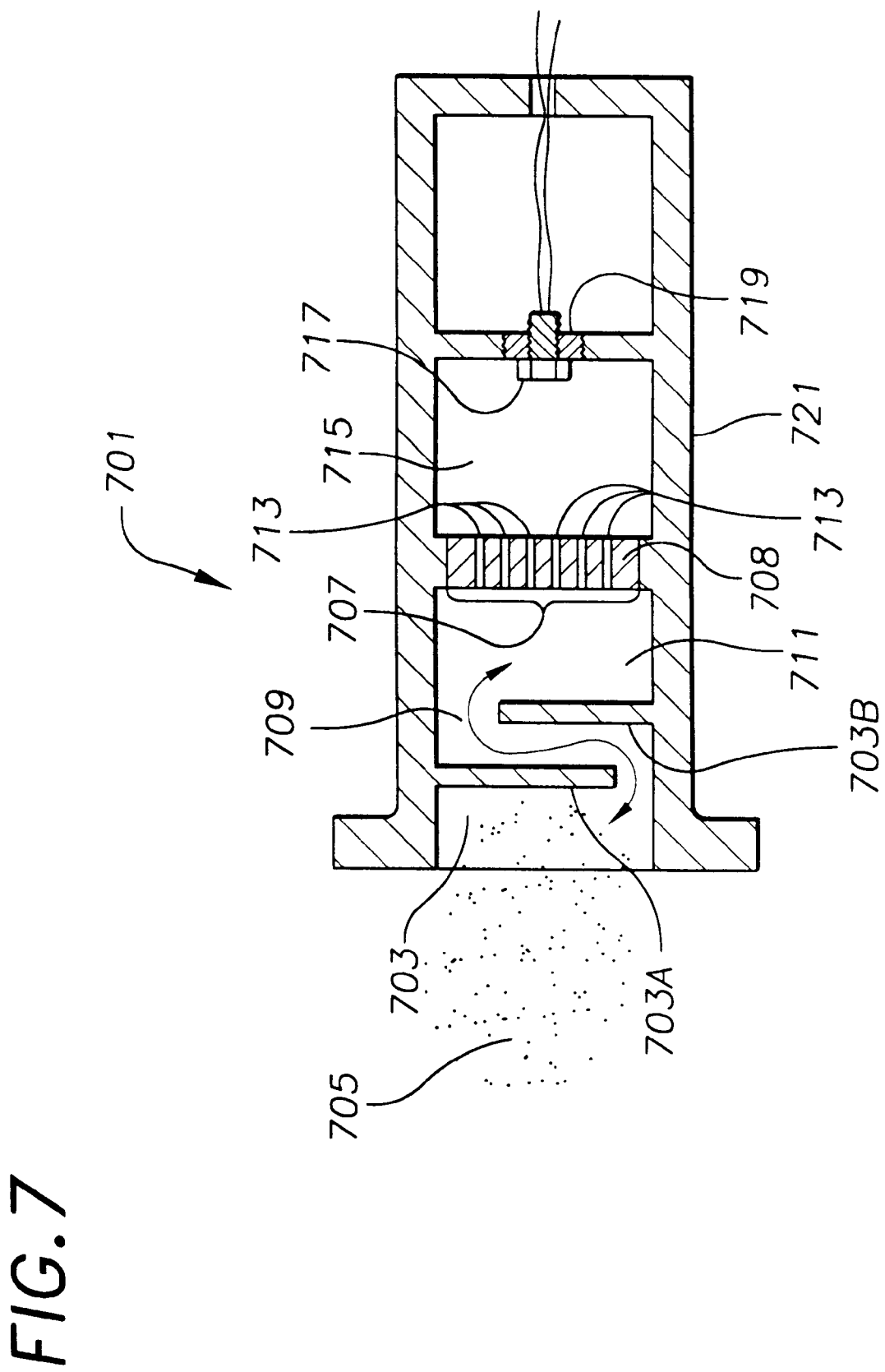

PRESSURE SENSOR MOUNTING DEVICE FOR HIGH TEMPERATURE ENVIRONMENTS

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

The present invention relates to mounting devices for transducers and, more specifically, for mounting devices for pressure transducers subject to extreme environmental conditions.

Modeling of air blast effects on structures often requires explosive testing to verify models. High explosives generate intense short term pressure levels and extreme temperatures. These extreme conditions may damage or destroy transducers such as pressure transducers used to measure air blast pressure profiles.

A number of methods have been used to limit the damaging effects of extreme temperature and pressure transients on pressure transducers. Pressure transducers have been mounted at the end of pipe or tubular structures to isolate the transducer from the air blast temperatures. These standoff techniques, although increasing the survivability of the transducer, increase noise levels in the pressure signal and introduce inaccuracies due to shock waves in the pipe structure. This method often fails to completely isolate the transducer from the heat which can be transmitted via intrusion of hot gasses into the pipe or conducted through the pipe itself.

U.S. Pat. No. 4,625,559, issued to Carter et al., discloses a pressure transducer comprising two concentric tubes in a housing to compensate for temperature changes.

U.S. Pat. No. 4,920,805, issued to Yajima et al., discloses a pressure sensor comprising a baffling structure to minimize the effect of temperature changes on the sensor element.

U.S. Pat. No. 5,046,365, issued to Kumley et al., discloses a thermal protection system for transducers incorporating a phase change heat sink combined with a multi-foil insulation material to minimize the effect of extreme temperatures.

None of the previous methods disclosed successfully address the problem of mounting and protecting a pressure transducer in the extreme environments resulting from high explosive testing.

SUMMARY OF THE INVENTION

Therefore an object of the present invention is to provide a pressure sensor mounting device that protects the pressure sensor transducer from overheating due to the extreme temperatures of an air blast or combustion.

A further object of the present invention is to provide a pressure sensor mounting device that provides blast protection to the transducer by attenuation of high frequency, high amplitude pressure transients that might otherwise destroy the sensor.

A further object of the present invention is to provide a pressure sensor mounting device that provides overtemperature protection to the transducer by transferring heat from the blast gasses to a heat sink.

A further object of the present invention is to provide a pressure sensor mounting device that can be mounted easily on structural surfaces such as walls, floors, ceilings or panels.

Yet another object of the present invention is to provide a pressure sensor mounting device which prevents corrosive particles or aerosols from contacting the transducer.

The device comprises a housing for enclosing and protecting a pressure sensor transducer from extreme temperatures, corrosive particles and high frequency, high amplitude pressure transients. The housing comprises a blast shield, an acoustic filter and a heat sink. Functionally, the blast shield protects the acoustic filter and the heat sink from damage that would result from direct impingement of blast particles, flame and hot gasses. The acoustic filter provides filtering of high amplitude, high frequency pressure pulsations which might otherwise damage the pressure transducer. The heat sink provides cooling of the gasses entering the housing and limits the temperature rise of the pressure transducer to acceptable levels.

In one embodiment of the invention, the three functions of blast shield, acoustic filter and heat sink are provided by two primary elements, a blast shield and an acoustic filter/heat sink. The housing supports the blast shield and the acoustic filter/heat sink in-line and prior to the pressure transducer. An expansion chamber is provided between the blast shield and the acoustic filter/heat sink and between the acoustical filter/heat sink and the pressure transducer to reduce the velocity of the gasses exiting the blast shield and the acoustic filter/heat sink.

In one embodiment, the blast shield comprises a plate with one or more drilled or punched holes or apertures which allow communication of pressure pulses exterior to the housing to the interior of the housing. The blast shield also provides blast protection to an acoustic filter/heat sink. The blast shield apertures protect the acoustic filter/heat sink by providing a restrictive path of reduced cross-sectional area reducing direct impingement of blast particles and flame with the acoustic filter/heat sink. The apertures also provide attenuation of peak blast pressure pulses which may otherwise over stress the acoustic filter/heat sink.

In the preferred embodiment of the invention, the blast shield comprises a plurality of drilled or punched holes of reduced cross-sectional area as compared to the interior of the housing. In other embodiments, the blast shield may comprise one or more apertures or paths resulting from one or more baffles placed in-line between the outside of the housing and the acoustic filter/heat sink. In the preferred embodiment, an expansion chamber between the blast shield and the acoustic filter/heat sink reduces the velocity of gasses and particles exiting the blast shield.

The acoustic filter/heat sink comprises a plurality of small, restrictive paths through a material of high thermal conductivity and high specific heat. The high thermal conductivity improves heat transfer from the gasses entering the element to the heat sink and within the heat sink itself. The high specific heat increases heat storage capacity of the heat sink. Metals such as bronze and stainless steel meet this requirement, and provide corrosion resistance to corrosive gasses entering the acoustic filter/heat sink. The cross-sectional area of each of the passages of the heat sink is small compared to the cross-sectional area of each of the apertures of the blast shield. The plurality of restrictive paths of the acoustic filter/heat sink also provides filtering of high frequency pressure pulsations which may damage the transducer.

In the preferred embodiment, the acoustic filter/heat sink is made of sintered metal. The small dimensions of the interconnected voids of the sintered metal (typically less than 100 microns) as compared to the thickness of the filter (typically 0.25–1.0 in.), combined with a high thermal conductivity and high specific heat of the metal results in good heat transfer from the medium to the acoustic filter/heat sink. The acoustic filter/heat sink cools the medium sufficiently to prevent damage to the pressure transducer. The large number of randomly spaced, tortuous paths produced by the interconnected voids of a sintered metal also provide good attenuation of the high frequency, high amplitude pressure transients originating from explosive events. The small void size also prevents the occurrence of measurable shock wave reflections within the acoustic filter/heat sink.

In other embodiments, the acoustic filter/heat sink comprises one or more plates comprising a large number of small drilled passages. The plates are made of a material having a high thermal conductivity and a high specific heat. Metals and composites comprising metals may used to perform this task. Hot gasses entering the drilled holes of the acoustic filter/heat sink are cooled as heat is transferred to the body portion of the acoustic filter/heat sink.

In the preferred embodiments, the heat sink limits the temperature rise of the transducer to less than 3 degrees centigrade per minute. In the preferred embodiments, the response time is less than 5 msec.

In the preferred embodiment, the housing comprises a cylindrical shaped mount base and a flange shaped outer housing. The outer housing comprising the blast shield has a diameter larger than the mount base. The inner flange face of the outer housing seats against a wall surface when the mount base is inserted into an opening in the wall, preventing ejection of the housing during an explosive event.

BRIEF DESCRIPTION OF THE DRAWINGS

These and other features, aspects and advantages of the present invention will become better understood with regard to the following description, appended claims and accompanying drawings where:

FIG. 7 is a schematic cross-section view of an alternative embodiment utilizing baffles as a blast shield and a drilled plate for the acoustic filter/heat sink.

DESCRIPTION OF THE PREFERRED EMBODIMENTS

The following is a description of the preferred embodiments of a mounting device for a pressure transducer for use in high temperature, hostile environments.

Figure 1:
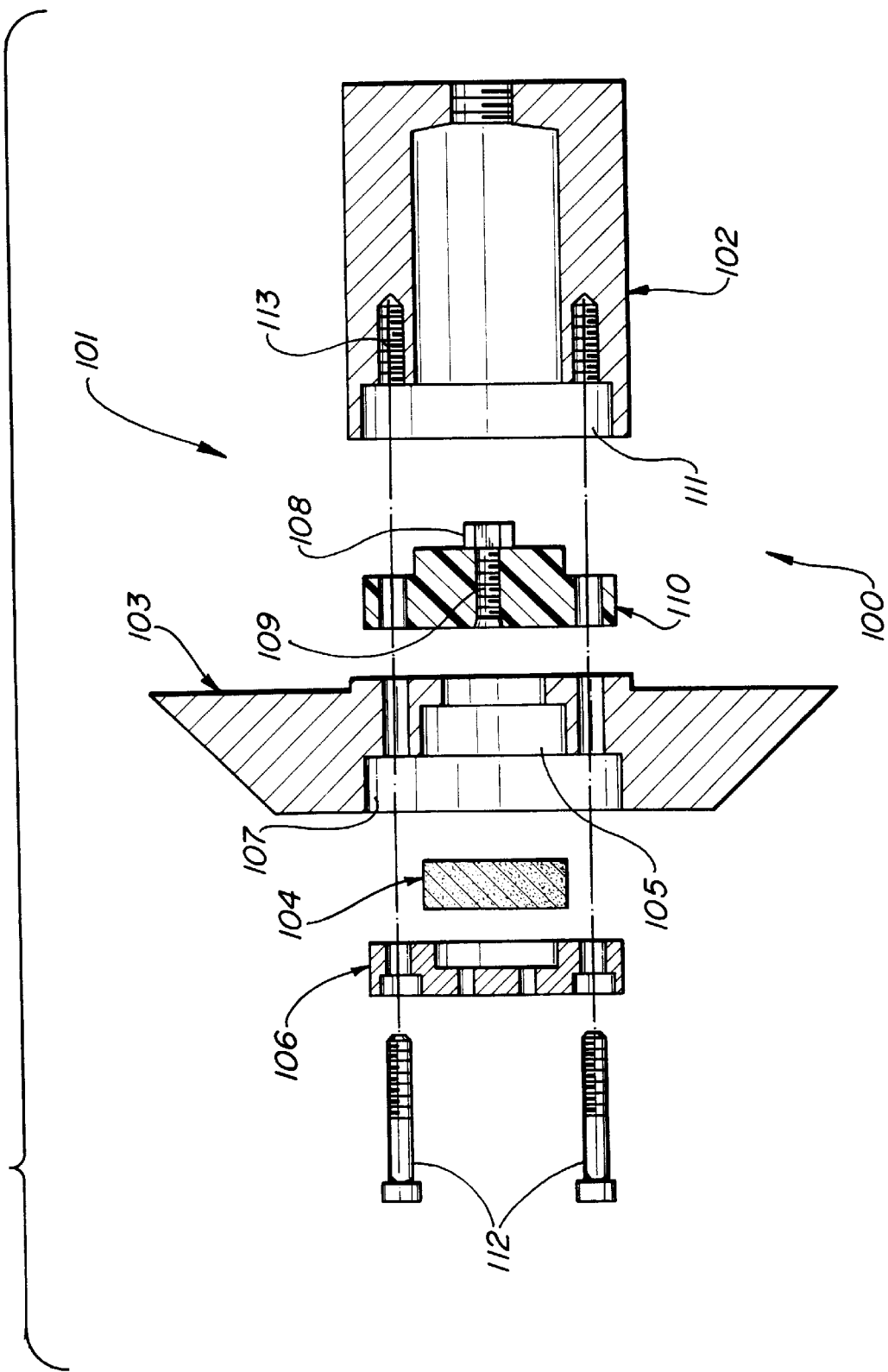
FIG. 1 is an exploded cross-section view of a preferred embodiment of the pressure transducer mounting device.

FIG. 1 is an exploded cross-section view of the preferred embodiment 100 of the mounting device. Housing 101 comprises mount base 102 and outer housing 103. Acoustic filter/heat sink 104 fits into recess 105 of outer housing 103. Blast shield 106 fits into recess 107 of outer housing 103. Pressure transducer 108 engages screw threads 109 of mount element or mounting plate 110 to secure pressure transducer 108 within housing 101. Mounting plate 110 fits into recess 111 of mount base 102. Threaded fasteners 112 and blast shield 106 secure outer housing 103 to mount base 102. Threaded fasteners 112 engage matching threads 113 of mount base 102.

Figure 2:
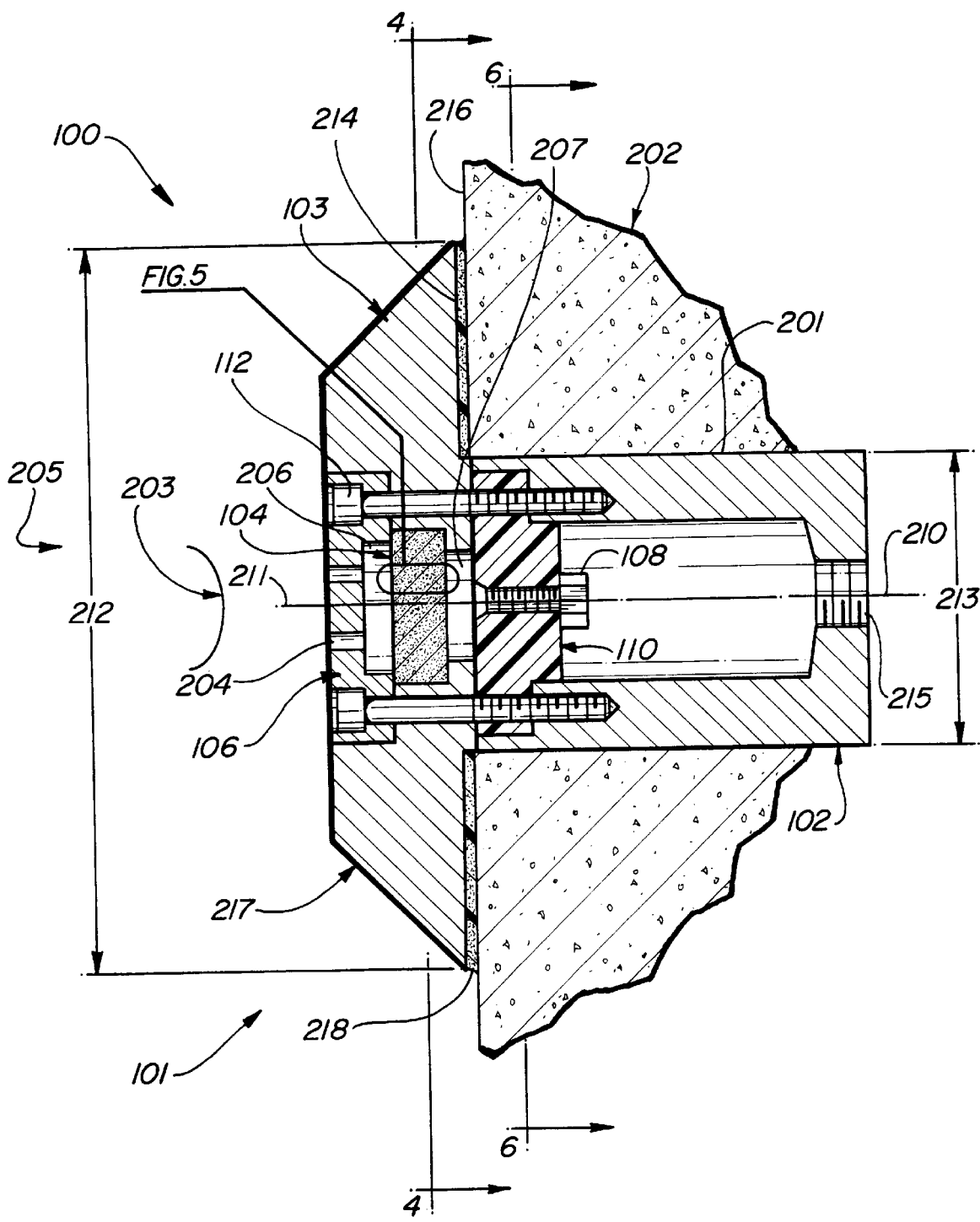
FIG. 2 is an elevation cross-section view of the assembled mounting device installed in a wall.

FIG. 2 is a cross-sectional elevation drawing of mounting device 100 assembled and inserted into opening 201 of concrete wall 202. Holes 204 of blast shield 106 transmit pressure pulse 203 originating from high temperature medium 205. Holes 204 provide protection for acoustic filter/heat sink 104 from direct impingement or blast effects which might otherwise damage acoustic filter/heat sink 104. Acoustic filter/heat sink 104, located between blast shield 106 and pressure transducer 108, provides cooling of high temperature medium 205 that enters housing 101 due to pressure pulse 203.

Longitudinal axis 211 of flange shaped outer housing 103 is coaxial with longitudinal axis 210 of cylindrical shaped mount base 102. Outer diameter 212 of outer housing 103 is greater than diameter 213 of mount base 102. Inner flange face 214 of outer housing 103 seats on outer face 216 of wall 202. Inner face 214 of outer housing 103 prevents ejection of mounting device 100 from wall 202 during an explosive event.

Acoustic filter/heat sink 104 divides the interior of housing 101 into two expansion chambers, first chamber 206 and second chamber 207. Blast shield holes 204 and chamber 206 provide a first attenuation effect of pressure pulse 203. Acoustic filter/heat sink 104 and chamber 207 provide a second attenuation of pressure pulse 203. Attenuation of pressure pulse 203 is necessary to protect pressure transducer 108 from damage from high frequency, high amplitude pressure transients which occur during explosive events.

Figure 3:
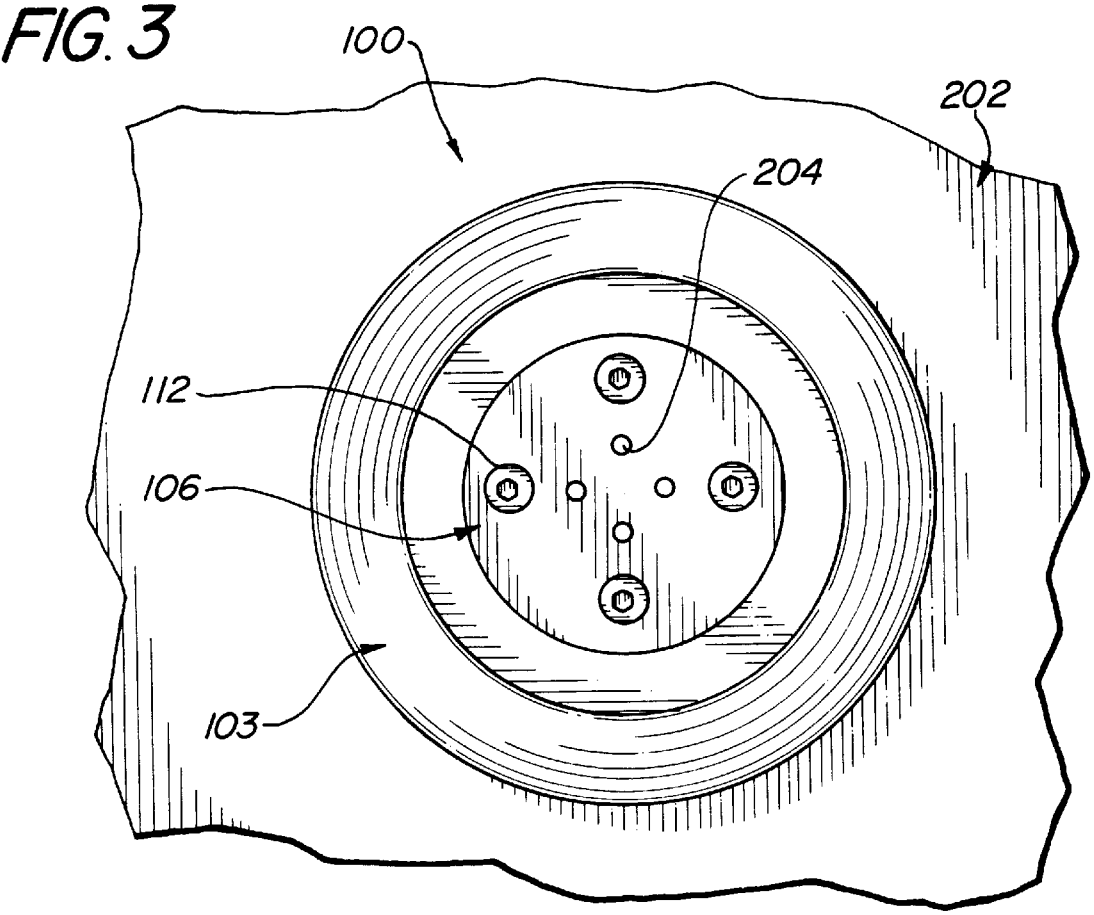
FIG. 3 is an end view of the mounting device looking at the blast shield end.

FIG. 3 is an end view looking at the blast shield end of mounting device 100 seated in wall 202. Blast shield 106 contains holes 204. The diameter of holes 204 is chosen to provide the desired pulse attenuation and blast protection for acoustic filter/heat sink 104. Threaded fasteners 112 secure blast shield 106 to outer flange 103.

Figure 4:
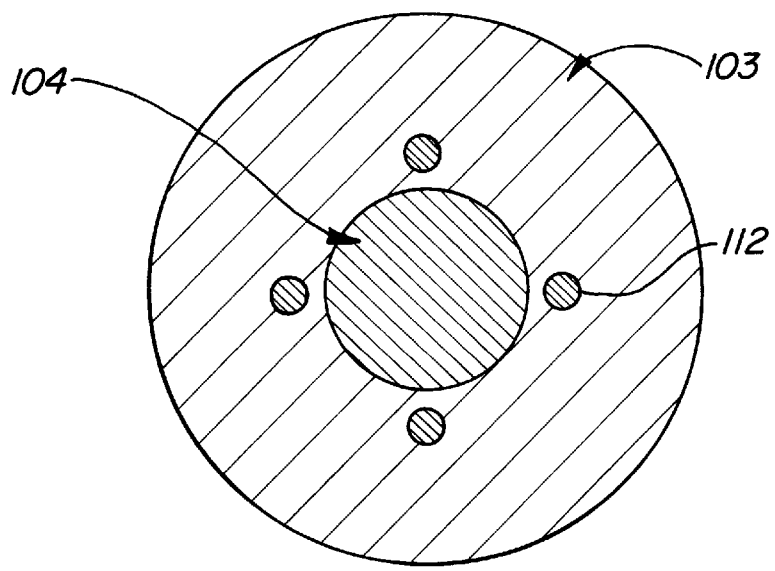
FIG. 4 is a cross-section view of the outer housing taken along lines 4—4 of FIG. 2.
Figure 5:
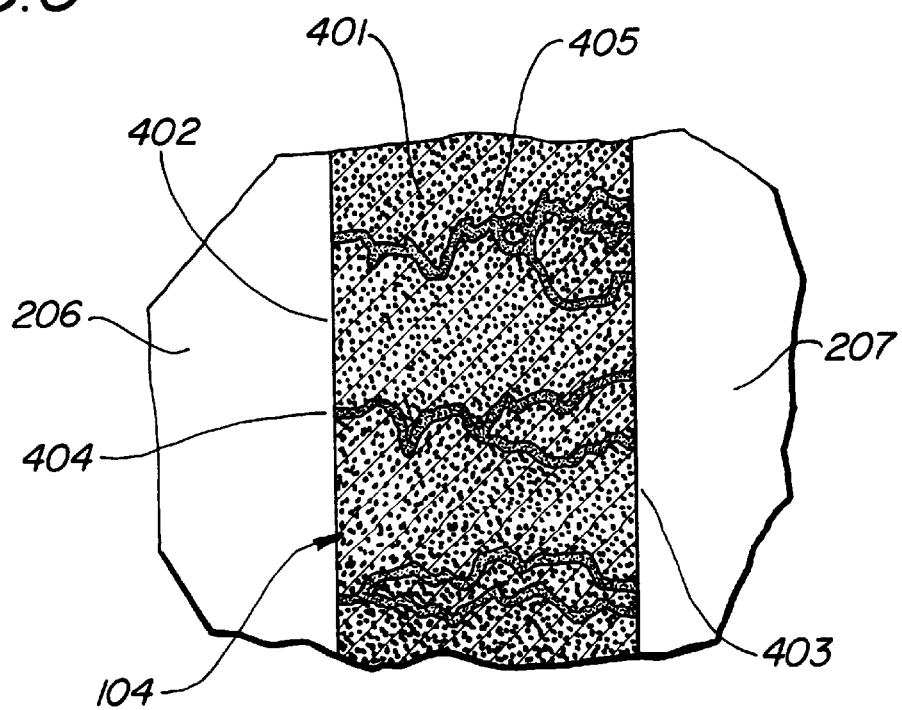
FIG. 5 is a detailed cross-section view of the acoustic filter/heat sink of FIG. 2.

FIG. 4 is a cross-section of outer housing 103 taken through lines 4—4 of FIG. 2. Acoustic filter/heat sink 104 is disk shaped and is retained in outer housing 103 by blast shield 106 of FIG. 2. FIG. 5 is a detailed cross-section of the acoustic filter/heat sink of FIG. 2. Acoustic filter/heat sink 104 is made of a sintered metal and comprises a plurality of randomly spaced voids 401. Voids 401 interconnect to form a plurality of restrictive or tortuous paths 404 from surface 402 of first chamber 206 to surface 403 of second chamber 207. The tortuous paths formed by voids 401 comprise a plurality of branches 405 which attenuate pressure pulse 203 of FIG. 2 and provide cooling of the high temperature medium that is transmitted from first chamber 206 to second chamber 207 by pressure pulse 203.

In the preferred embodiment, acoustic filter/heat sink 104 is made of a sintered metal such as stainless steel. Stainless steel provides the mechanical strength necessary to provide structural integrity of the acoustic filter/heat sink during intense air blasts. Stainless steel also provides corrosion resistance to blast contaminants. Other sintered metals and filters comprising a plurality of fine tortuous paths provide the necessary filtering and cooling of the blast.

Void dimensions (or filtration grade) of the acoustic filter/heat sink should be less than 100 microns to provide the desired pulse attenuation, heat transfer and particulate filtering. In the preferred embodiment, filter void size is 5–20 microns. For example, a 10 micron filter grade acoustic filter/heat sink results in a shock reflection frequency of 670 MHz at atmospheric pressure. This frequency is higher than measurable with instrumentation used in blast pressure measurement, resulting in a reduction of measurable noise. Small acoustic filter/heat sink void size also filters particulates and aerosols resulting from the detonation of explosives or by the combustion of flammable materials or incendiary devices. Corrosion damage to the transducer is prevented by filtering of these particulates and aerosols. A further advantage of small void size is increased strength of the acoustic filter/heat sink. This higher strength of the acoustic filter/heat sink results in higher tolerance to the extreme pressure pulses of an explosive event.

Figure 6:
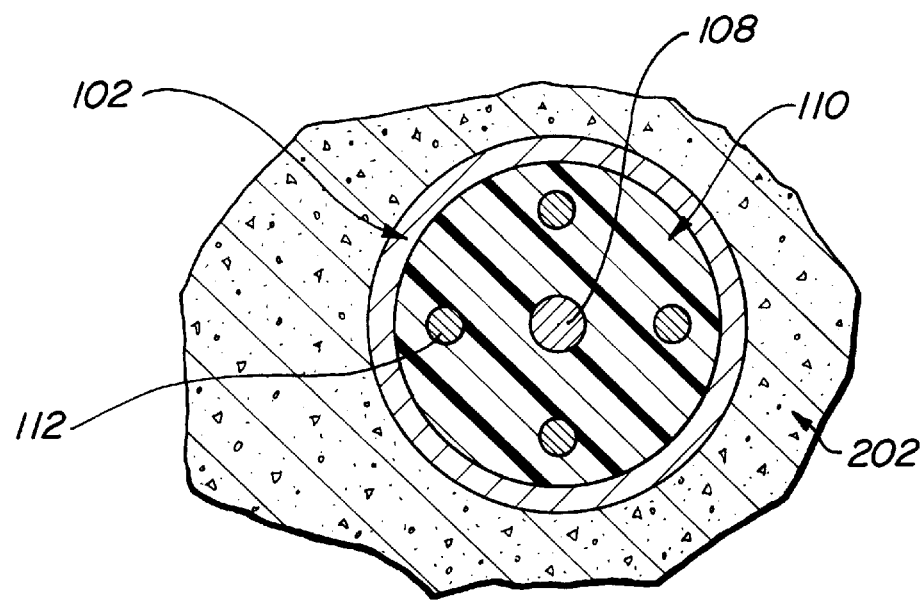
FIG. 6 is a cross-section view of the mount base taken along lines 6—6 of FIG. 2.

FIG. 6 is a cross-section of mount base 102 seated in wall 202 taken along lines 6—6 of FIG. 2. Pressure transducer 108 is fixed in mounting plate 110. Mounting plate 110, made of a material of high thermal and electrical resistance, provides thermal protection from heat conducted through mount base 102. The high electrical resistance of mount base 110 provides electrical isolation of the pressure transducer from mounting device 100.

A high temperature insulating material such as ceramic paint (217 of FIG. 2) coats outer housing 103 and provides additional thermal protection to the interior of mounting device 100. A high temperature caulk 218 provides sealing of mounting device 100 in concrete wall 202. A threaded opening (215 of FIG. 2) provides an opening and mechanical connection point for pressure transducer cable and conduit (not shown).

In the preferred embodiment, mount base 102, outer housing 103, blast shield 106 and threaded fasteners 112 are made of stainless steel. Mounting plate 110 is made of polytetrafluoroethylene (PTFE). Other materials may be used which meet the requirements of the service.

FIG. 7 shows a schematic cross-section of an alternative embodiment of mounting device 701 utilizing baffles 703A and 703B to reduce direct impingement of blast particles 705 on acoustic filter/heat sink 707. Blast shield 703 comprising baffles 703A and 703B require particles 705 to take a non-linear, restrictive path 709 to expansion chamber 711 and acoustic filter/heat sink 707. The combination of the restrictive path and expansion chamber 711 protect acoustic filter/heat sink 707 by reducing the quantity and velocity of particles striking acoustic filter/heat sink 707. Blast shield 703 also reduces peak pressure pulsations and direct flame contact which might damage acoustic filter/heat sink 707.

Acoustic filter/heat sink 707 comprises a plurality of small drilled passages 713. Acoustic filter/heat sink 707 is made of a material having a relatively high thermal conductivity and a relatively high specific heat, and good corrosion resistance, such as stainless steel. Gasses entering acoustic filter/heat sink 707 are cooled by transferring heat to the body portion 708 of acoustic filter/heat sink 707. Expansion chamber 715 further cools and mixes gasses passing through acoustic filter/heat sink 707 and limits heating of transducer 717. Use of a material having high thermal resistance for mount element 719 reduces conductive heating of the transducer through housing 721. Use of a material having good electrical insulation properties for mount element 719 provides electrical isolation of transducer 717.

Accordingly, the reader will see that the Pressure Sensor Mounting Device for High Temperature Environments provides a device that protects a pressure transducer from extreme environments. The device provides the following additional advantages: The device provides acoustic filtering to attenuate high frequency, high amplitude pressure transients; The device protects the transducer from corrosive particles and aerosols; The device provides cooling of the medium entering the device during a pressure transient to provide thermal protection of the transducer; And the device is simple and low in cost.

Although the description above contains many specifications, these should not be construed as limiting the scope of the invention but as merely providing illustrations of some of the presently preferred embodiments of this invention. For example, the housing may be a threaded body design. Several acoustic filters or heat sinks may be used. Or, the transducer mount plate may be integral with the housing, etc. Thus the scope of the invention should be determined by the appended claims and their legal equivalents, rather than by the examples given.

We claim:

1. A mounting device for a pressure sensing transducer comprising:
   a housing,
   a mount element fixed to the housing, the mount element defining a transducer mount position interior to the housing;
   a blast shield fixed to the housing, the blast shield comprising an aperture for communicating a pressure pulse to the transducer mount position in the housing; and
   a heat sink disposed interior to the housing between the blast shield and the transducer mount position, the heat sink made of a material of a predetermined specific heat and a predetermined thermal conductivity and comprising a plurality of small passages through the heat sink wherein a blast gas entering the heat sink is cooled before contacting a transducer mountable in the mount element;
   wherein the aperture of the blast shield reduces direct impingement of blast particles carried by the blast gas on the heat sink.

2. The mounting device of claim 1 wherein each of the small passages of the heat sink comprise a cross-sectional area substantially less than a cross-sectional area of the aperture of the blast shield.

3. The mounting device of claim 1 wherein the heat sink is made of sintered metal.

4. The mounting device of claim 3 wherein the sintered metal of the heat sink comprises a filtration grade of less than 100 microns.

5. The mounting device of claim 3 wherein the heat sink is made of sintered stainless steel.

6. The mounting device of claim 1 wherein the heat sink is made of a metal plate comprising a plurality of drilled holes, the diameter of the drilled holes being substantially less than the diameter of the aperture of the blast shield.

7. The mounting device of claim 1 comprising an acoustic filter disposed in the housing between the blast filer and the transducer mount position, the acoustic filter comprising a plurality of passages to reduce a peak pulse amplitude transmitted to the transducer.

8. The mounting device of claim 7 wherein the acoustic filter and the heat sink are the same element.

9. The mounting device of claim 8 wherein said same element is made of sintered metal.

10. The mounting device of claim 1 wherein the blast shield is a plate comprising a plurality of apertures.

11. The mounting device of claim 1 wherein the blast shield comprises at least one baffle.

12. The mounting device of claim 1 comprising a first expansion chamber disposed between the blast shield and the heat sink, the first expansion chamber reducing a velocity of blast particles exiting the blast shield.

13. The mounting device of claim 1 comprising a second expansion chamber disposed between the heat sink and the transducer mount position, the second expansion chamber reducing a velocity of gasses exiting the heat sink.

14. The mounting device of claim 1 wherein the heat sink is an acoustic filter/heat sink and the housing comprises a mount base and an outer housing, the mount base being cylindrical shaped and comprising a first diameter and a first longitudinal axis, the outer housing being flange shaped and comprising a second longitudinal axis coaxial with the first longitudinal axis, the outer housing comprising a second diameter greater than the first diameter wherein the mounting device is retained by the outer housing contacting a wall face when the mount base is inserted into a wall opening.

15. The mounting device of claim 14 wherein the blast shield and acoustic filter/heat sink are retained in the outer housing and the mounting plate is retained in the mount base.

16. The mounting device of claim 15 wherein the mount base comprises a threaded opening for receiving an electrical coupling.

17. The mounting device of claim 16 wherein the outer housing is retained to the mount base by threaded fasteners.

18. The mounting device of claim 17 wherein the outer housing comprises an insulating coating.

19. The mounting device of claim 15 wherein the insulating coating is a ceramic containing paint.

20. A mounting device for a pressure sensing transducer comprising:

a housing comprising a first end portion and second end portion;

a mount element fixed to the housing and defining a transducer mount position interior to the housing in the first end portion;

a blast shield fixed to the second end portion of the housing, the blast shield comprising a plurality of apertures for communicating a pressure pulse to the interior of the housing;

a heat sink disposed in the housing between the blast shield and the transducer mount position, the heat sink made of a sintered metal wherein a blast gas entering the heat sink is cooled before contacting the transducer mount position;

a first expansion chamber disposed between the blast shield and the heat sink; and a second expansion chamber disposed between the heat sink and the transducer mount position.

* * * * *